(12) United States Patent  (10) Patent No.: US 8,061,718 B2
Krondorfer (45) Date of Patent: Nov. 22, 2011

(54) TOOLLESS BITHOLDER FOR SPIRAL SAWS

(75) Inventor: Harald Krondorfer, Mundelein, IL (US)

(73) Assignee: Robert Bosch GmbH, Stuttgart (DE)

( * ) Notice: Subject to any disclaimer, the term of this patent is extended or adjusted under 35 U.S.C. 154(b) by 1147 days.

(21) Appl. No.: 11/881,534

(22) Filed: Jul. 27, 2007

(65) Prior Publication Data

US 2009/0026718 A1    Jan. 29, 2009

(51) Int. Cl.
*B23B 31/20* (2006.01)
*B23B 31/22* (2006.01)

(52) U.S. Cl. ............. 279/42; 279/43.4; 279/48; 279/69; 279/75; 279/137

(58) Field of Classification Search ..................... 279/43, 279/43.4, 19, 22, 60–62, 75, 82, 46.3, 48, 279/69, 81, 137, 42
See application file for complete search history.

(56) References Cited

U.S. PATENT DOCUMENTS

| | | | |
|---|---|---|---|
| 3,618,962 A * | 11/1971 | Cox et al. ...................... 279/82 |
| 3,947,047 A | 3/1976 | Hultman |
| 4,197,044 A * | 4/1980 | Cummings ................... 409/232 |
| 4,266,895 A * | 5/1981 | Lewis ........................... 409/232 |
| 4,279,597 A * | 7/1981 | Grimm ......................... 433/129 |
| 4,345,851 A * | 8/1982 | Soussloff ..................... 403/369 |
| 4,602,798 A * | 7/1986 | Wettstein ....................... 279/48 |
| 5,032,043 A * | 7/1991 | Hollifield ..................... 409/234 |
| 5,398,946 A * | 3/1995 | Quiring ......................... 279/30 |
| 5,788,248 A * | 8/1998 | Gibson ........................... 279/51 |
| 5,810,366 A * | 9/1998 | Montjoy et al. ................ 279/43 |
| 5,918,886 A * | 7/1999 | Horiuchi et al. ............... 279/58 |
| 5,947,484 A * | 9/1999 | Huggins et al. ............. 279/43.4 |
| 5,951,024 A * | 9/1999 | Montjoy et al. ................ 279/43 |
| 5,957,634 A | 9/1999 | Carpinetti |
| 6,059,296 A * | 5/2000 | Baeder ............................ 279/20 |
| 6,062,574 A * | 5/2000 | Yorde .............................. 279/49 |
| 6,457,916 B2 * | 10/2002 | Wienhold .................... 408/240 |
| 6,554,292 B1 * | 4/2003 | Rohm ........................... 279/137 |
| 6,561,523 B1 * | 5/2003 | Wienhold ...................... 279/30 |
| 6,581,942 B2 * | 6/2003 | Rohm ............................. 279/62 |
| 6,929,266 B2 * | 8/2005 | Peters et al. .................... 279/82 |

(Continued)

OTHER PUBLICATIONS

Rotozip® Operating and Safety Instructions, downloaded Nov. 14, 2006 from www.rotozip.com (17 pages).

*Primary Examiner* — Eric A Gates
*Assistant Examiner* — Bayan Salone
(74) *Attorney, Agent, or Firm* — Maginot, Moore & Beck

(57) ABSTRACT

A bit holder for a rotary tool is disclosed herein. In one embodiment, the bit holder comprises a drive shaft with an elongated bit channel configured to receive a tool bit for the rotary tool. A cavity is provided in a peripheral wall of the drive shaft. The cavity extends in a radial direction from the bit channel to an outer portion of the drive shaft. A moveable lock member is positioned in the cavity of the drive shaft. A collet is positioned in the bit channel apart from the cavity. The collet includes a collapsible end portion configured to clamp down on the tool bit. A collet nut rotatably engages the drive shaft and is moveable between a release position and a lock position. In the lock position the collet nut clamps the collapsible end portion of the collet while also forcing the lock member into the bit cavity.

16 Claims, 5 Drawing Sheets

U.S. PATENT DOCUMENTS

| | | | |
|---|---|---|---|
| 6,945,145 B1 * | 9/2005 | Kesinger | 81/487 |
| 6,966,562 B1 * | 11/2005 | Wienhold | 279/75 |
| 7,264,429 B2 * | 9/2007 | Miller | 409/182 |
| 7,328,903 B2 * | 2/2008 | Casel | 279/43 |
| 2004/0081523 A1 * | 4/2004 | Vasudeva et al. | 408/240 |
| 2006/0043685 A1 | 3/2006 | Kozak | |

* cited by examiner

TOOLLESS BITHOLDER FOR SPIRAL SAWS

FIELD

This application relates to the field of rotary tools, including rotary power tools, and bit holders for such rotary tools.

BACKGROUND

Rotary tools are widely used to perform various tasks. Rotary tools include those tools with a rotary output shaft where a tool bit is secured to the output shaft. A chuck, collet or other means is provided on the end of the output shaft is typically used to secure the tool bit to the rotary tool. Depending on the tool bit used, different functions may be performed with the rotary tool, such as drilling, cutting, carving, sanding, polishing and many other applications. Examples of rotary tools include drills and spiral saws.

Users of rotary tools often wish to quickly change from one bit to another in order to perform different functions or make use of bits of different sizes. When changing a bit in a rotary tool, the new bit needs to be secured to the output shaft in both an axial direction, and a circumferential direction and also needs to be centered in the bit holder. Securing the bit to the output shaft in the axial direction prevents the bit from being pulled out of the tool during operation. Securing the bit to the output shaft in the circumferential direction prevents the bit from slipping and insures that rotary power/torque from the output shaft is properly transmitted to the bit. Centering the bit in the bit holder provides for a balanced tool that will properly perform the desired operation.

Some prior art rotary tools require an additional tool, such as a wrench, to properly secure the tool bit to the output shaft. However, a user wishing to quickly change from one bit to another may find the requirement of an additional tool bothersome. Accordingly, it would be desirable to provide a bit holder for a rotary tool that does not require the use of an additional tool to secure the bit to the output shaft of the rotary tool. Furthermore, it would be desirable for such a toolless bit holder to effectively secure the bit to the output shaft of the rotary tool in the axial and circumferential directions while also centering the bit in the bit holder.

It would be desirable to provide a toolless bit holder that provides one or more of the above-mentioned or other advantageous features as may be apparent to those reviewing this disclosure. However, the teachings disclosed herein extend to those embodiments which fall within the scope of the appended claims, regardless of whether they accomplish one or more of the above-mentioned advantages.

SUMMARY

An embodiment of a bit holder for a rotary tool comprises a drive shaft with an elongated bit channel formed in an end of the drive shaft. The elongated bit channel includes a bit seat and a collet seat. A cavity is provided in the drive shaft which extends from the bit seat to an outer portion of the drive shaft. A lock member is provided in the cavity of the drive shaft. The lock member includes a ball or other member that is moveable within the cavity between an inner opening to the bit seat and an outer opening to the exterior of the drive shaft. A collet is positioned in the collet seat of the bit channel. The collet includes a two opposing collapsible end portions, each collapsible end portion having a plurality of fingers with slots between the fingers. A sleeve engages the drive shaft and is moveable between a release position and a lock position on the drive shaft. When the sleeve is in the lock position, the sleeve clamps one of the collapsible end portions of the collet, forcing the fingers closer together. Also, when the sleeve is in the lock position, the sleeve forces the lock member at least partially into the bit channel. If a bit is positioned in the bit channel, the ball engages a circumferential groove on the bit to lock the bit in the bit channel. When the sleeve is moved to a release position, an inner annular groove on the sleeve is aligned with the cavity in the drive shaft. The lock member situated in the cavity may be forced into the annular inner groove when the sleeve is in the release position, thus opening the bit channel such that the tool bit may be inserted into or pulled out of the bit channel.

In at least one embodiment, the bit seat is provided with a polygonal cross-section configured to engage a complimentary shape on a tool bit such that a geometric interlock is provided between the bit seat and the tool bit.

The above described features and advantages, as well as others, will become more readily apparent to those of ordinary skill in the art by reference to the following detailed description and accompanying drawings.

DESCRIPTION

Figure 1:
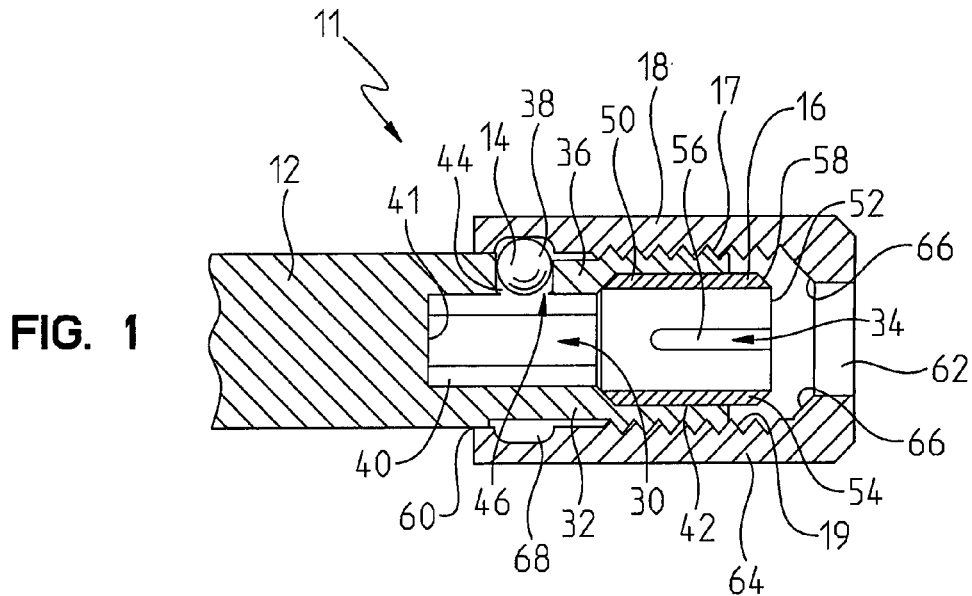
FIG. 1 shows a cross-sectional view of a toolless bit holder with a sleeve a release position.

With reference to FIG. 1, an exemplary embodiment of a bit holder 11 for a rotary tool is shown. The bit holder 11 comprises a drive shaft 12, a locking member 14, a collet 16, and an outer sleeve 18. The sleeve 18 engages the drive shaft 12 and is moveable on the drive shaft between a release position and a lock position. As set forth below, the sleeve 18 is configured to engage both the lock member 14 and the collet 16 to either secure a rotary tool bit 20 to the drive shaft 12 or release a tool bit 20 from the drive shaft 12.

The drive shaft 12 is a generally cylindrical shaft of circular cross-section provided as the rotating output shaft of a rotary tool. Alternatively, the drive shaft may be connected to the output shaft of a rotary tool. As shown in FIG. 1, an elongated bit channel 30 is formed in an end 32 of the drive shaft 12. The bit channel 30 is defined by a forward mouth/opening 34 in the end 32 of the drive shaft 12 and a peripheral wall 36 on the end of the drive shaft.

The peripheral wall 36 defines two distinct portions in the elongated bit channel 30. In particular, the elongated bit channel 30 comprises a bit seat 40 and a collet seat 42. The bit seat 40 portion of the elongated bit channel 30 is configured to receive the end of a rotary tool bit, such as the rotary tool bit 20 of FIG. 2. In at least one embodiment, the bit seat 40 has a non-circular cross-section, such as, for example, a hexagonal or other polygonal cross-section. The collet seat 42 portion of the elongated bit channel 30 is provided forward of the bit seat 40 on the end 32 of the drive shaft 12, such that the collet seat 42 is provided near an end tip of the drive shaft 12. The collet seat 42 has a circular cross-section and is configured to receive the collet 16.

A cavity 44 extends through the peripheral wall 36 of the drive shaft 12. The cavity 44 provides a transverse passage that extends in a radial direction from the bit seat 40 portion of the elongated bit channel 30 to an outer portion of the drive shaft 12. Accordingly, the cavity 44 includes an inner opening 46 that leads to the bit channel 30 and an outer opening 48 (see FIG. 3) that opens to the outer surface of the drive shaft 12. The inner opening 46 is slightly tapered such that the diameter of the cavity 44 is slightly smaller at the inner opening 46 than in the other portions of the passage 44.

The cavity 44 is configured to retain the locking member 14. In the disclosed embodiment, the locking member 14 is a spherical ball 38. The ball 38 is moveable within the cavity 44 between the inner opening 46 and the outer opening 48. The diameter of the passage at the inner opening 46 is slightly smaller than the diameter of the ball 38 such that the ball 38 is only allowed to pass partially through the inner opening 46 and only partially into the bit channel 30. By blocking the ball 38 from passing completely into the bit channel 30, the ball 38 is retained within the cavity 44 even if the bit 20 is not in the bit channel 30.

Figure 4:
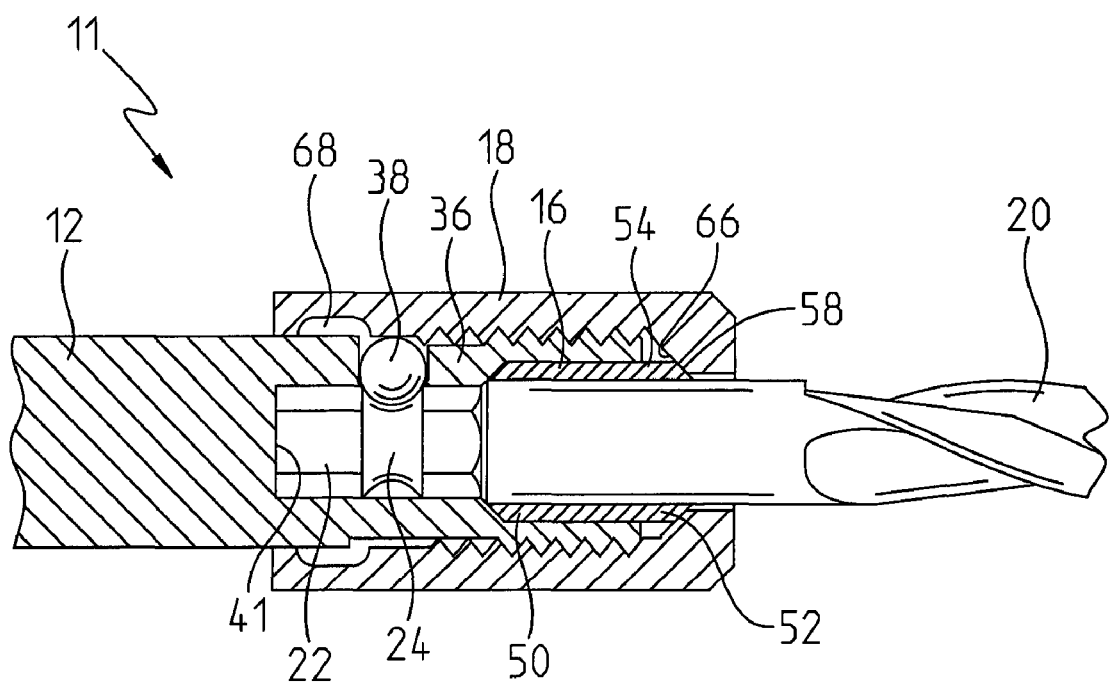
FIG. 4 shows a cross-sectional view of the bit of FIG. 2 positioned within the toolless bit holder.

The rotary tool bit 20 comprises an elongated shaft which includes a geometric lock portion 22, a circumferential groove 24, a circular shaft portion 25, and a working piece 27 in the form of a cutting portion. The geometric lock portion 22 is provided on an end portion 21 of the bit 20. The cross-sectional shape of the geometric lock portion is non-circular and closely corresponds to the non-circular cross-section of the bit seat 40. In the embodiment shown in FIG. 2, the geometric lock portion 22 of the bit 20 is hexagonal and dimensioned slightly smaller in diameter than the bit seat 40. This allows the hexagonal geometric lock portion 22 of the bit 20 to easily fit down in the bit seat 40. The corresponding non-circular shapes defined on the bit seat 40 and the geometric lock portion 22 of the bit 20 facilitate a geometric interlock, securing the bit 20 in the bit seat 40 in the circumferential direction, while the bit 20 remains in a releasable engagement with the bit seat 40 in an axial direction. FIG. 4 shows the geometric lock portion 22 of the bit 20 fully seated in the bit seat 40 such that the end 21 of the bit 20 abuts a rear wall 41 of the bit seat 40.

Figure 2:
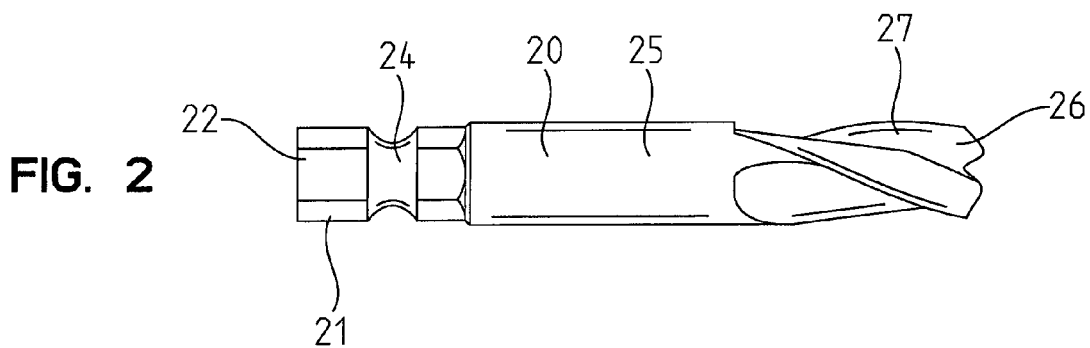
FIG. 2 shows a side view of a bit configured for placement in the toolless bit holder of FIG. 1.

In the embodiment of FIG. 2, the circumferential groove 24 is provided on the geometric lock portion 22 on the end 21 of the bit 20 shaft. The groove 24 is centered upon the axis of the bit 20 shaft and the shape of the groove 24 is defined by a radius of curvature that substantially matches the radius of the ball 38. This groove shape allows a part of the ball 38 to actually fit down in the groove 24 along the radius of curvature when the ball 38 engages the groove 24. FIG. 4 also shows the ball 38 engaging the circumferential groove 24 of the bit 20 when the bit 20 is fully seated in the bit channel 30. With the ball 38 in this position engaging the circumferential groove 24 of the bit 20, the bit 20 is locked in place in the bit channel in the axial direction. While the circumferential groove 24 is shown with a radius of curvature in FIG. 2, the groove may also be provided in other configurations, such as a square groove or other shaped groove.

As shown in FIGS. 2 and 4, the bit 20 further includes a circular shaft portion 25 adjacent to the geometric lock portion 22. The circular shaft portion 25 provides a cylindrical portion with a relatively smooth outer surface. The cross-sectional shape of the circular shaft portion 25 is circular. As explained in further detail below, this circular shaft portion 25 is configured to engage the collapsible end portion of the collet 16.

Provided next to the circular shaft portion 25 on an opposing end 26 of the bit 20 is a working piece 27. The working piece 27 is the portion of the bit configured to perform some work, such as cutting. For example, the working piece 27 may comprise a drill or saw that is rotated by the drive shaft 12. The bit 20 may be formed as a single integral piece or may be otherwise fashioned such that the two ends 21 and 26 are joined together to provide a unitary piece.

With reference again to FIG. 1, the collet 16 is positioned in the collet seat 42 of the bit channel 30. The collet 16 is generally cylindrical and includes a first collapsible end portion 50 with an opposed second collapsible end portion 52. Openings are formed at both the first collapsible end portion 50 and the second collapsible end portion 52 that are dimensioned to allow the tool bit 20 to pass completely through the collet 16. The first collapsible end portion 50 of the collet is situated in the collet seat 42, and the second collapsible end portion 52 extends beyond the collet seat 42 and the tip of the drive shaft 12.

The collapsible end portions 50, 52 include a plurality of fingers with slots extending between each finger. For example, the second collapsible end portion 52 may include three fingers 54 positioned at 120° angles with respect to one another, with the related slots 56 separating the fingers 54 also positioned at 120° angles. The slots 56 allow the fingers 54 to be forced together to create a smaller diameter opening at the collapsible end 52 than is provided when the fingers are not forced together. Because the collet 16 is comprised of a resilient material, when a collapsing force is removed from the fingers 54, the fingers 54 return to their equilibrium position with the slots 56 separating each of the fingers. The tips 58 of the fingers 54 on the second collapsible end portion 52 of the collet are chamfered and configured to engage a tapered portion 66 of the sleeve 18. Likewise, the tips of the fingers on the first collapsible end portion of the collet are chamfered and configured to engage a tapered portion in the collet seat 42. The fingers 54 on the second collapsible end portion 52 extend past the forward opening 34 of the drive shaft 12, providing access to the collapsible end 52 of the collet such that the fingers may be clamped together, as described in further detail below.

The sleeve 18 is provided as a collet nut that engages the outer surface of the drive shaft 12. The engagement between the drive shaft 12 and the sleeve 18 is a threaded engagement such that rotation of the sleeve 18 causes the sleeve 18 to move in an axial direction along the drive shaft 12. The treads 17 are provided on the outer surface of the drive shaft 12 with complimentary threads 19 on the inner surface of the sleeve. Although an exemplary threaded relationship is described herein for the embodiment of FIG. 1, those of skill in the art will recognize that other arrangements, such as other threaded arrangements, are possible for engagement of the sleeve 18 and the drive shaft 12 such that the sleeve is permitted to move in the axial direction along the drive shaft.

The sleeve 18 includes a rear opening 60, a forward opening 62, and a peripheral wall 64. The rear opening 60 is circular and configured to receive the drive shaft 12. The forward opening 62 is generally circular and provides a mouth configured to receive and pass the tool bit 20. The diameter of the mouth 62 is smaller than that of the rear opening 60. The peripheral wall 64 extends between the rear opening 60 and the forward opening 62. In the embodiment disclosed herein the peripheral wall 64 includes a cylindrical exterior surface having a generally hexagonal cross-section and a cylindrical interior surface having a generally circular cross-section.

Figure 3:
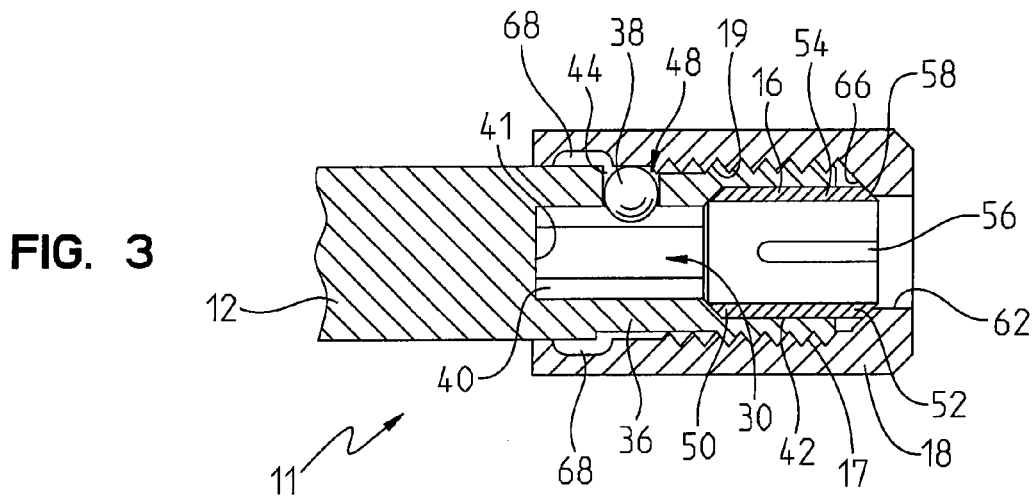
FIG. 3 shows a cross-sectional view of the toolless bit holder of FIG. 1 with the sleeve in a locking position.

The peripheral wall 64 includes an annular inner groove 68 formed in the inner surface of the peripheral wall 64. The annular groove 68 faces the drive shaft 12 and is large enough to receive at least a portion of the ball 38 when the groove 68 is aligned with the cavity 44 of the drive shaft 12. Because the sleeve 18 is configured to move axially along the drive shaft 12, the annular groove 68 may be moved into alignment with the cavity 44, as shown in FIG. 1, and out of alignment with the cavity 44, as shown in FIG. 3. When the groove 68 aligned with the cavity 44, as shown in FIG. 1, the sleeve 18 is in a release position, as the ball 38 is free to move into the groove 68 and completely open the elongate bit channel 30 for a tool bit. When the groove 68 is not aligned with the cavity 44, as shown in FIG. 3, the sleeve 18 is in a locked position, as the peripheral wall 64 of the sleeve forces the ball 38 toward the inner opening 46 of the cavity 44 such that a part of the ball 38 extends into the bit channel 30 to partially block the bit channel 30. As shown in FIG. 4, when the bit 20 is fully seated in the bit channel, the ball 38 engages the circumferential groove 24, locking the bit in the bit channel in the axial direction.

A tapered portion 66 is provided on the interior surface of the peripheral wall 64 of the sleeve 18 near the mouth 62 of the sleeve 18. The tapered portion 66 is provided as a conical section having a similar taper angle to the tips 58 of the fingers. When the tapered portion 66 of the sleeve 18 contacts the tips 58 of the fingers 54 as the sleeve moves axially to the rear, i.e., as the mouth 62 moves toward the collet 16, the tips 58 of the fingers 54 slide along the tapered portion 66 of the sleeve 18 toward the mouth 62. As the fingers 54 slide along the tapered portion 66 of the sleeve 18, the fingers 54 move toward one another, thus collapsing the collapsible end 52 of the collet 16. Accordingly, the sleeve 18 acts as a clamp which clamps down on the collapsible end portion 52 of the collet 16 and forces the fingers 54 of the collet closer together. As shown in FIG. 4, when a bit 20 is positioned in the bit channel 30, the fingers 54 collapse around the bit 20 and clamp down on the bit 20 when the sleeve 18 clamps down on the collet 16. This clamping action of the fingers 54 centers the bit 20 within the bit holder and provides an additional friction fit between the bit holder 11 and the bit 20.

In operation, the bit holder 11 provides a mechanism for securely retaining a tool bit in without the need for tools. Starting from the release position of FIG. 1, the sleeve 18 is in a release position such that it does not clamp down on the collapsible end of the collet. In addition, the annular groove 68 of the sleeve is aligned with the transverse opening 44 in the drive shaft 12, allowing the ball 38 to extend partially into the annular groove 68 such that the bit channel 30 is free of the ball 38.

From this release position of FIG. 1, a bit 20 may be inserted into the bit channel 30. As the bit is forced into the bit channel 30, the hex geometric lock portion 22 of the bit engages the ball 18, forcing the ball out of the bit channel 30 and into the annular groove 68 of the sleeve 18. When the bit 20 is fully seated in the bit channel 30, the circumferential groove 24 of the bit 20 is aligned with the cavity 44, as shown in FIG. 4. The sleeve 18 is then rotated to move the sleeve 18 to the locked position as also shown in FIG. 4. The threaded relationship between the sleeve 18 and the drive shaft 12 causes the sleeve to move axially along the drive shaft 12 when the sleeve 18 is rotated. As the annular groove 68 of the sleeve 18 is moved out of alignment with the cavity 44, the peripheral wall 64 of the sleeve 18 forces the ball into the circumferential groove 24 of the bit 20, locking the bit 20 axially in the bit channel 30. Further rotation of the sleeve 18 brings the tapered portion 66 of the sleeve 18 into engagement with the finger tips 58 of the collet 16. As the tapered portion 66 of the sleeve 18 is driven into further engagement with the collet 16, the finger tips 58 of the collet 16 ride along the tapered portion 66 of the sleeve 18, causing the fingers 54 of the collet to collapse inward and clamp down on the bit 20. This clamping action by the collet 16 further secures the bit 20 in place within the bit holder 11 while also ensuring that the bit 20 is centered within the bit holder.

In order to remove the bit 20 from the bit holder 11, the sleeve 18 is rotated in the opposite direction such that the tapered portion 66 of the sleeve 18 moves away from the finger tips 58 of the collet 16. Once the sleeve 18 is returned to the position shown in FIG. 1, the bit 20 may be pulled out of the bit channel 30. As the bit 20 is pulled axially away from the bit channel 30, the geometric lock portion 22 of the bit forces the ball 38 into the annular groove 68 of the sleeve 18, thus clearing the bit seat 40 and allowing the bit 20 to be removed from the bit channel 30.

Figure 5:
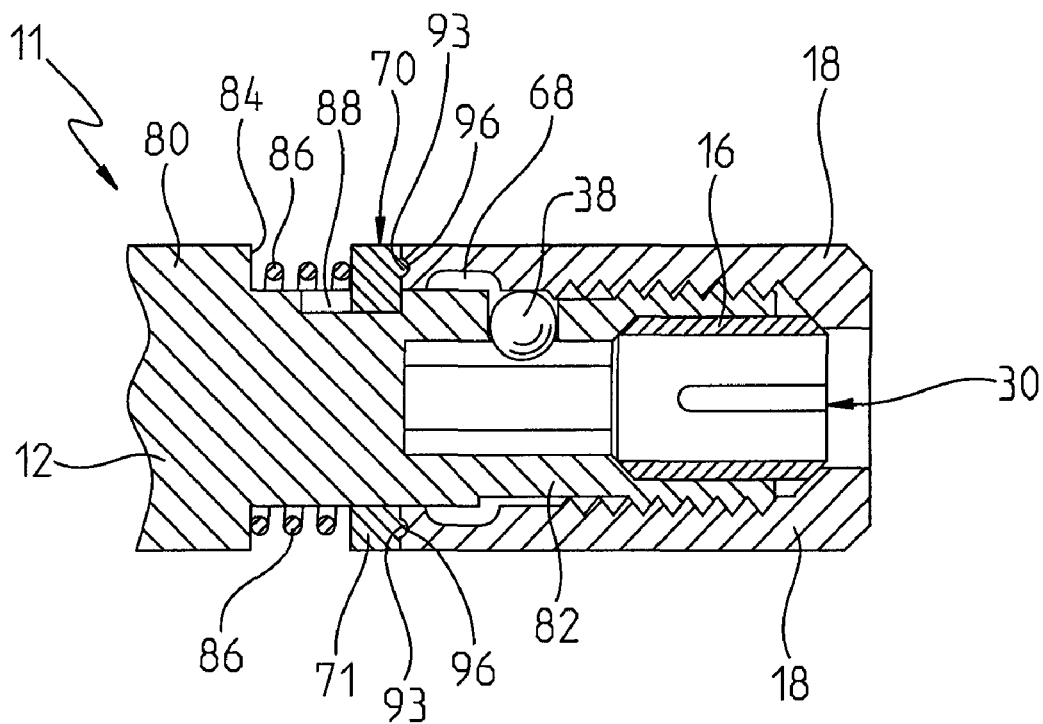
FIG. 5 shows an alternative embodiment of the toolless bit holder of FIG. 1 with the sleeve in a locking position.

An alternative embodiment of the bit holder 11 is shown in FIG. 5. In this embodiment, the bit holder further comprises a securing member 70 configured to engage the sleeve 18 when the sleeve is in the lock position and fasten the sleeve 18 to the drive shaft 12. In the embodiment of FIG. 5, the securing member 70 is a washer 71. The drive shaft 12 includes a first shaft portion 80 having a larger outer diameter connected to a second shaft portion 82 having a smaller outer diameter. A shoulder 84 is defined between the first shaft portion 80 and the second shaft portion 82. A spring 86 is positioned on the second shaft portion 82 between the shoulder 84 and the washer 71. A short axial slot 88 is included in the second shaft portion 82 and is configured to engage a tab 98 provided on the washer 71, thus preventing rotation of the washer on the shaft.

Figure 6:
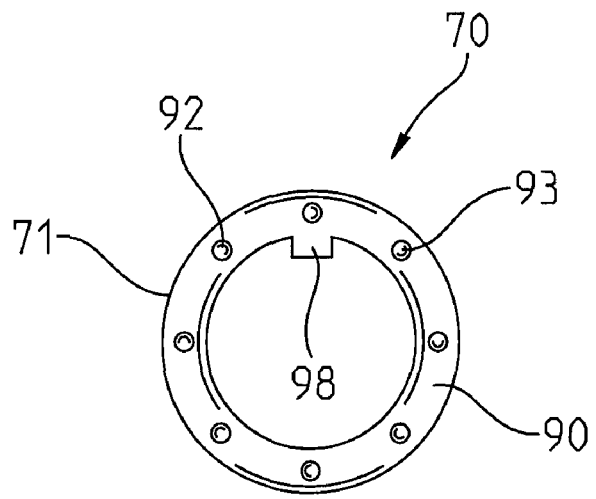
FIG. 6 shows a front view of a washer configured for use with the toolless bit holder of FIG. 5.

The washer 71 is positioned on the second shaft portion 82 between the spring 86 and the sleeve 18, and is coaxial with the second shaft portion 82. The washer 71 includes a rear face that contacts the spring 86 and a forward face 90 that contacts the sleeve 18. As shown in FIG. 6, the forward face 90 includes a plurality of surface irregularities 92. In the embodiment of FIG. 6, the irregularities are dimples or bumps 93 which protrude from the forward face 90. The dimples are configured to engage complimentary recesses 96 formed in the end of the sleeve 18. The tab 98 of the washer extends radially inward and is configured to engage the axial slot 88 on the drive shaft 12.

As shown in FIG. 5, the washer 71 is oriented on the drive shaft 12 with the tab 98 extending into the axial slot 88. The spring 86 biases the washer 71 toward the sleeve 18 such that the dimples 93 on the washer 71 extend into the recesses 96 on the sleeve. This engagement between the dimples 93 and the recesses 96 secures the washer 71 to the sleeve 18 in the circumferential direction. Likewise, the engagement between the tab 98 and the slot 88 secures the washer 71 to the drive shaft in a circumferential direction. Accordingly, by virtue of the washer 71, the sleeve 18 is releasably fastened to the drive shaft 12 in the circumferential direction.

In order to release the sleeve 18 from the drive shaft 12 such that the sleeve 18 may be rotated, the washer 71 is pulled rearward, away from the sleeve 18. When the washer 71 is pulled away from the sleeve 18, the dimples 93 are removed from the complimentary recesses 96 on the sleeve and the washer 71 compresses the spring 86 against the shoulder 84. With the washer 71 in this rear position, the sleeve 18 may be rotated toward either the release position or the locking position, as described above. Once the sleeve 18 is placed in the desired position, the washer 71 is released and the spring 86 forces the washer 71 back into engagement with the sleeve, thus fastening the sleeve in place on the drive shaft 12.

Figure 7:
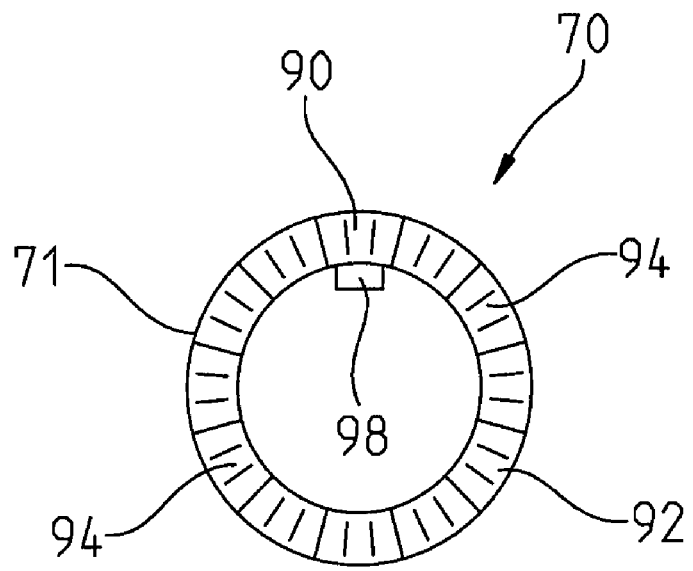
FIG. 7 shows a front view of an alternative embodiment of the washer of FIG. 6.
Figure 8:
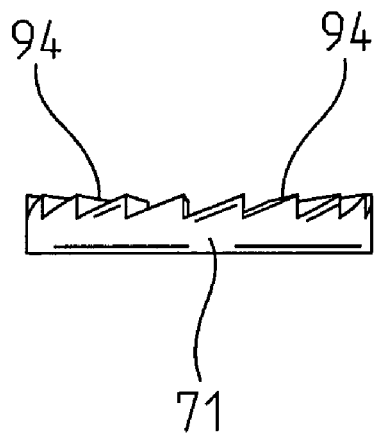
FIG. 8 shows a side view of the washer of FIG. 7.

FIGS. 7 and 8 show an alternative embodiment of the washer 71. In this embodiment, the forward face 90 of the washer 71 includes surface irregularities 92 in the form of radial teeth 94. In this embodiment, the end of the sleeve 18 includes complimentary radial teeth (not shown) that engage the teeth 94 of the washer in a ratchet-like fashion. The ratchet action of the radial teeth 94 may be used to provide an audible indication that the sleeve 18 is secured in place on the drive shaft 12. In addition, the ratcheting action of the washer allows the sleeve to be tightened without the need to pull the washer away from the sleeve. A secure relationship between the sleeve 18 and the drive shaft 12 is desirable to ensure that the sleeve 18 remains tightly engaged against the collet 16 such that the collet 16 tightly clamps down on the tool bit 20 during use of the rotary tool.

Figure 9:
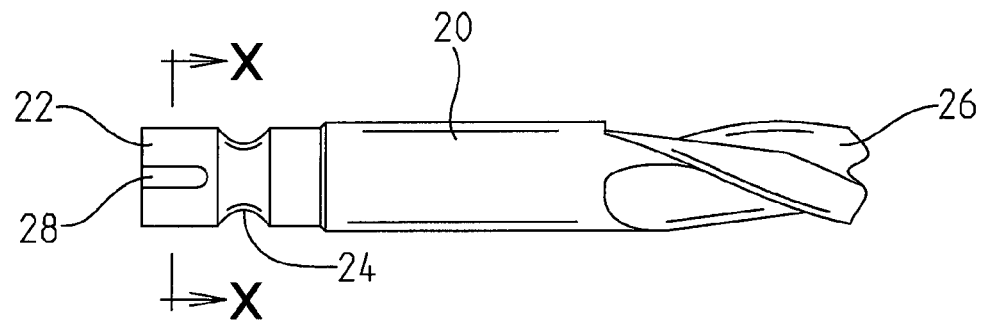
FIG. 9 shows a side view of an alternative embodiment of the bit of FIG. 2.
Figure 10:
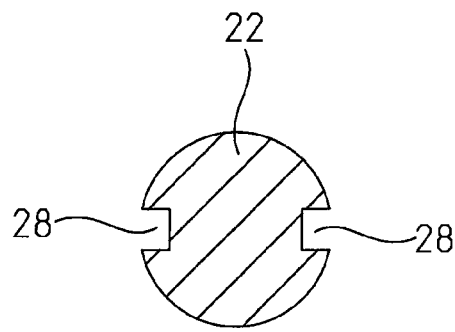
FIG. 10 shows a cross-sectional view of the bit of FIG. 9 through line X-X.
Figure 12:
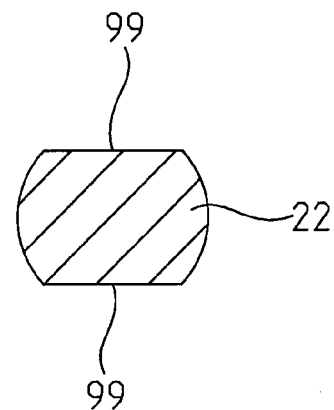
FIG. 12 shows a cross-sectional view of another alternative embodiment of the bit of FIG. 2.
Figure 11:
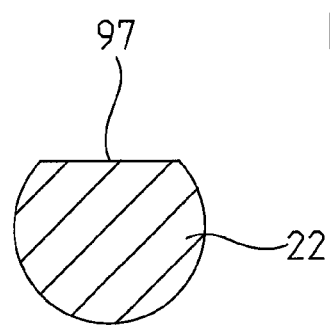
FIG. 11 shows a cross-sectional view of an alternative embodiment of the bit of FIG. 2.

An alternative embodiment of the tool bit 20 is shown in FIGS. 9 and 10. In this embodiment, the geometric lock portion 22 of the tool bit is not hexagonal, but instead includes two opposing slots 28. The slots are configured to receive complimentary protrusions provided in the bit seat 40. When the protrusions engage the slots 28, the tool bit 20 is locked in place in the bit seat 40 in the circumferential direction. One of skill in the art will recognized that numerous other cross-sectional shapes could be used to provide a geometric interlock between the geometric lock portion 22 of the bit 20 and the bit seat 40. For example, as shown in FIG. 11, the geometric lock portion 22 could include a single flat side 97, or, as shown in FIG. 12, opposing flat sides 99 could be provided on the geometric lock portion 22. In either event, complimentary flat sides are provided on the bit seat 40 to the tool bit holder.

Although the present invention has been described with respect to certain preferred embodiments, it will be appreciated by those of skill in the art that other implementations, modifications, and adaptations are possible. For example, while the shoulder of FIG. 5 has been disclosed as being provided with a shaft having a larger outer diameter portion and a smaller outer diameter portion, one of skill in the art will recognize that other means may be used to provide a shoulder, such as a C-clip. As another example, the sleeve may include a knurled or overmolded exterior surface to assist in obtaining a better grip on the sleeve. Moreover, there are advantages to individual advancements described herein that may be obtained without incorporating other aspects described above. Therefore, the spirit and scope of the appended claims should not be limited to the description of the preferred embodiments contained herein.

What is claimed is:

1. A bit holder for a rotary tool, the bit holder comprising:
a drive shaft including an elongated bit channel formed in an end of the drive shaft and a cavity extending from the bit channel to an outer portion of the drive shaft;
a lock member provided in the cavity of the drive shaft, the lock member moveable within the cavity;
a collet positioned in the bit channel, the collet including a collapsible end portion; and
a sleeve engaging the drive shaft and moveable between a release position and a lock position on the drive shaft, wherein the sleeve clamps the collapsible end portion of the collet and forces the lock member at least partially into the bit channel when the sleeve is in the lock position,
wherein the sleeve includes an annular inner groove that is aligned with the cavity of the drive shaft when the sleeve is in the release position such that the lock member extends at least partially into the annular inner groove when the sleeve is in the release position.

2. The bit holder of claim 1 wherein the sleeve does not clamp the collapsible end of the collet and does not force the lock member at least partially into the bit channel when the sleeve is in the release position.

3. The bit holder of claim 1 wherein the collapsible end of the collet includes a plurality of fingers and wherein the plurality of fingers are forced closer together when the sleeve clamps the collapsible end of the collet.

4. The bit holder of claim 1 wherein the sleeve includes a mouth with a tapered interior surface, wherein the collapsible end of the collet is chamfered, and wherein the tapered interior surface of the mouth of the sleeve engages the chamfered collapsible end of the collet when the sleeve is in the lock position.

5. The bit holder of claim 1 wherein the bit channel includes a bit end seat and a collet seat.

6. The bit holder of claim 5 wherein the bit end seat has a polygonal cross-section.

7. The bit holder of claim 1 wherein the lock member comprises a ball.

8. The bit holder of claim 1 wherein the sleeve is a collet nut, and the collet nut threadedly engages the drive shaft.

9. The bit holder of claim 1 further comprising a securing member configured to engage the sleeve when the sleeve is in the lock position and fasten the sleeve to the drive shaft.

10. A bit holder for a rotary tool, the bit holder comprising: a drive shaft including an elongated bit channel formed in an end of the drive shaft and a cavity extending from the bit channel to an outer portion of the drive shaft; a lock member provided in the cavity of the drive shaft, the lock member moveable within the cavity; a collet positioned in the bit channel, the collet including a collapsible end portion; and a sleeve engaging the drive shaft and moveable between a release position and a lock position on the drive shaft, wherein the sleeve clamps the collapsible end portion of the collet and forces the lock member at least partially into the bit channel when the sleeve is in the lock position; a securing member configured to engage the sleeve when the sleeve is in the lock position and fasten the sleeve to the drive shaft; wherein the securing member comprises a washer moveably positioned on the drive shaft, and wherein a spring biases the washer toward the sleeve.

11. The bit holder of claim 10 wherein the washer includes a plurality of surface irregularities that engage complimentary surface irregularities provided on an end of the sleeve opposite the mouth.

12. The bit holder of claim 11 wherein the drive shaft includes an axial recess configured to receive a tab provided on the washer.

13. An arrangement for retaining a rotary tool bit, the arrangement comprising:
a) an elongate bit channel defined by a forward opening and a peripheral wall;

b) a collet positioned in the bit channel, the collet including a plurality of fingers extending past the forward opening;
c) a cavity extending through the peripheral wall, the cavity including an inner opening and an outer opening;
d) a locking member moveably positioned in the cavity; and
e) a sleeve arranged radially outward of the bit channel, the sleeve moveable between a lock position and a release position, wherein the sleeve forces the plurality of fingers of the collet closer together when the sleeve is in the lock position, wherein the locking member extends at least partially through the inner opening of the cavity when the sleeve is in the lock position, and wherein the locking member is free to extend at least partially through the outer opening when the locking member is in the release position, wherein the sleeve includes an annular interior groove, wherein the annular interior groove is aligned with the cavity when the sleeve is in the release position.

14. The arrangement of claim 13 wherein the sleeve does not engage the fingers of the collet when the sleeve is in the release position.

15. The arrangement of claim 13 wherein the sleeve is configured to rotate about the bit channel in order to move the sleeve between the lock position and the release position.

16. The arrangement of claim 13 wherein the bit channel is provided within a drive shaft and the sleeve threadedly engages the drive shaft.

\* \* \* \* \*